(12) United States Patent
Pepin et al.

(10) Patent No.: US 8,998,506 B2
(45) Date of Patent: Apr. 7, 2015

(54) FIELD TERMINABLE ST FORMAT OPTICAL FIBER CONNECTOR

(71) Applicant: 3M Innovative Properties Company, St. Paul, MN (US)

(72) Inventors: Ronald P. Pepin, Georgetown, TX (US); Jerome A. Pratt, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/022,288

(22) Filed: Sep. 10, 2013

(65) Prior Publication Data
US 2014/0079356 A1 Mar. 20, 2014

Related U.S. Application Data (60) Provisional application No. 61/701,180, filed on Sep. 14, 2012.

(51) Int. Cl.
*G02B 6/36* (2006.01)
*G02B 6/38* (2006.01)

(52) U.S. Cl.
CPC ............ *G02B 6/3624* (2013.01); *G02B 6/3846* (2013.01); *G02B 6/3891* (2013.01)

(58) Field of Classification Search
USPC .......................... 385/55, 56, 58, 62, 76, 77, 81
See application file for complete search history.

(56) References Cited

U.S. PATENT DOCUMENTS

| 4,824,197 | A | 4/1989 | Patterson |
| 5,102,212 | A | 4/1992 | Patterson |
| 5,138,681 | A | 8/1992 | Larson |
| 5,155,787 | A | 10/1992 | Carpenter |
| 5,159,653 | A | 10/1992 | Carpenter |
| 7,280,733 | B2 * | 10/2007 | Larson et al. ................ 385/139 |
| 7,369,738 | B2 | 5/2008 | Larson |
| 8,070,367 | B2 | 12/2011 | Winberg |
| 2007/0104425 | A1 | 5/2007 | Larson |
| 2008/0226236 | A1 * | 9/2008 | Pepin et al. .................... 385/81 |
| 2011/0044588 | A1 | 2/2011 | Larson |
| 2012/0027360 | A1 | 2/2012 | Larson |

(Continued)

FOREIGN PATENT DOCUMENTS

| CN | 201628781 U | 1/2010 |
| CN | 202372665 U | 8/2012 |
| JP | 11-160563 | 6/1999 |

(Continued)

OTHER PUBLICATIONS

International Search Report for PCT/CN2013/083389, mailed on Dec. 19, 2013, 3 pp.
"3M™ No Polish ST Connector SM and MM, Flat Splice, 250/900 μm", Instruction Manual, Jun. 2012 (8 pp.).

*Primary Examiner* — Robert Tavlykaev
(74) *Attorney, Agent, or Firm* — Kristofor L. Storvick (57) ABSTRACT

An ST format optical connector for terminating an optical fiber comprises a housing configured to mate with an ST receptacle or coupling, the housing having an ST bayonet-style format. The ST format optical connector also includes a collar body and a retainer disposed in the housing, where the collar body is retained between the housing and the retainer. The housing is prevented from fully rotating about the collar body and retainer. In addition, the connector can be deactivated for fiber repositioning or reuse.

7 Claims, 6 Drawing Sheets

(56) References Cited

U.S. PATENT DOCUMENTS

2012/0328248 A1* 12/2012 Larson et al. .................. 385/81
2013/0177278 A1 7/2013 Guo

FOREIGN PATENT DOCUMENTS

| WO | WO 2006/019515 | 2/2006 |
| WO | WO 2006/019516 | 2/2006 |

* cited by examiner

FIELD TERMINABLE ST FORMAT OPTICAL FIBER CONNECTOR

CROSS-REFERENCE TO RELATED APPLICATION

This application claims the benefit of U.S. Provisional Patent Application No. 61/701,180, filed Sep. 14, 2012, the disclosure of which is incorporated by reference herein in its entirety.

BACKGROUND OF THE INVENTION

1. Field of the Invention

The present invention is directed to an optical connector.

2. Related Art

Mechanical optical fiber connectors for the telecommunications industry are known. For example, LC, ST, FC, and SC optical connectors are widely used.

ST (straight tip) connectors were developed by AT&T for fiber network implementations. These connectors have a bayonet-style mechanism that allows for connection/disconnection to a coupling or receptacle with a twist-on/twist-off motion.

Many ST connectors were made by inserting a bare fiber into a hollow ferrule and bonding the fiber into the ferrule with, typically, an epoxy-based adhesive.

Also known are hybrid optical splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

More recently, U.S. Pat. Nos. 7,369,738 and 8,070,367 describe optical fiber connectors that include a pre-polished fiber stub disposed in the ferrule that is spliced to a field fiber with a mechanical splice.

SUMMARY OF THE INVENTION

According to a first aspect of the present invention, an ST format optical connector for terminating an optical fiber is provided. The ST format connector includes a housing configured to mate with an ST receptacle or coupling. The housing has an ST bayonet-style format. The ST format optical connector further includes a collar body disposed in the housing and a retainer disposed in the housing, wherein the collar body is retained between the housing and the retainer element. The housing is prevented from fully rotating about the collar body and retainer.

In another aspect, the collar body includes a fiber stub disposed in a first portion of the collar body, the fiber stub being mounted in a ferrule and having a first end proximate to an end face of the ferrule and a second end. The collar body further includes a mechanical splice disposed in a second portion of the collar body, the mechanical splice configured to splice the second end of the fiber stub to the optical fiber.

In another aspect, the collar body further includes a buffer clamp configured within a third portion of the collar body, the buffer clamp configured to clamp at least a portion of a buffer cladding of the optical fiber upon actuation; and a buffer clamp actuation sleeve configured to be received on an outer surface of the third portion of the collar body and configured to slidably actuate the buffer clamp, the buffer clamp actuation sleeve including a flange portion formed on one end thereof.

In another aspect, the optical connector further comprises a fiber boot to restrict a lateral motion of the optical fiber, the fiber boot mountable to a portion of the retainer.

In another aspect, the fiber boot further includes one or more access slots formed through the outer surface thereof configured to permit access to the flange portion of the sleeve when the sleeve is mounted on the buffer clamp.

In another aspect, the housing includes a housing slot positionable over the mechanical splice.

In another aspect, the housing includes an inner tab receivable within a retention slot formed on an outer surface of the retainer when the connector is in an unconnected state.

In another aspect, during a connection with an ST coupling, when the housing is moved toward the ST coupling, the inner tab is released from the retention slot.

In another aspect, the collar body further includes a key structure formed on an outer surface configured to be received by a slot formed in the ST coupling.

In another aspect, the retainer further includes a ledge formed on an outer surface thereof configured to contact the inner tab to prevent additional rotation of the housing.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to an optical connector. In particular, the optical connector of the exemplary embodiments is an ST-format optical connector of compact length that is capable of straightforward field termination. The exemplary connector described herein can be readily installed and utilized for Fiber To The Home (FTTH) and/or Fiber To The X (FTTX) network installations. The exemplary connector can be utilized in installation environments that require ease of use when handling multiple connections, especially where labor costs are more expensive.

Figures 1, 2:
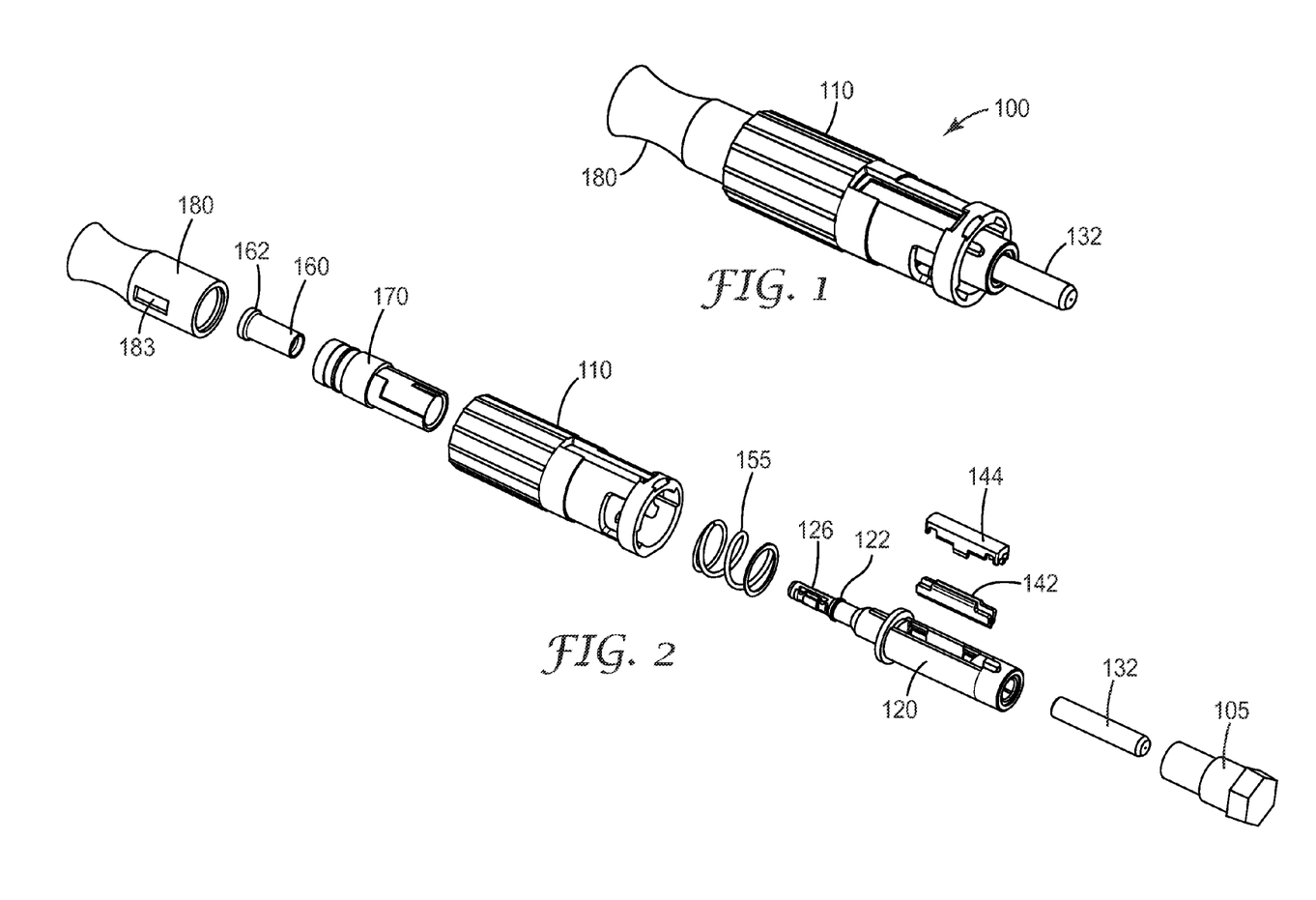
FIG. 1 is an isometric view of a ST format optical connector for terminating an optical fiber according to an aspect of the present invention.
FIG. 2 is an exploded view of the optical connector of FIG. 1.
Figure 3:
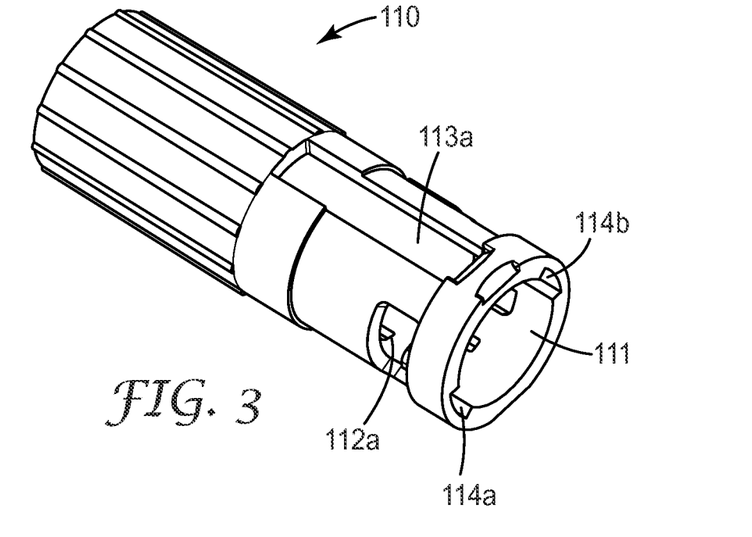
FIG. 3 is an isometric view of the outer housing of the optical connector of FIG. 1.

According to an exemplary embodiment of the present invention, an optical fiber connector 100 is shown in isometric view in FIG. 1 and in exploded view in FIG. 2. FIGS. 3-6 show other views of connector 100 or components thereof. Optical connector 100 is configured to mate with an ST receptacle or coupling, as is illustrated in FIGS. 7A-7C.

ST-type optical fiber connector 100 can include a connector body having a housing 110 and a fiber boot 180. In this exemplary embodiment, housing 110 includes a bayonet-style outer shell having a front face that is configured to be received by an ST receptacle (e.g., an ST coupling, an ST adapter, or an ST socket), and a retainer 170 that provides further structural support. The housing 110 also contains a ferrule 132, a collar body 120, and a spring 155.

Housing 110 has a bayonet-style outer shell. In one aspect of the invention, the bayonet-style outer shell has limited rotational ability when engaging an ST compatible receptacle, socket or coupling. Some exemplary structure for limiting the housing rotation is described further herein.

Housing 110 includes an opening 111 that receives an ST compatible coupling. Slots 112a, 112b are formed near the opening 111 and engage the posts or stubs 212 (see FIGS. 7A-7C) of the ST coupling during connector engagement/disengagement with the ST coupling. Notches 114a, 114b are formed on an inner surface of the opening 111 of the outer housing to allow for passage of the coupling posts or stubs 212 into housing slots 112a, 112b.

Housing 110 also includes an opening 113a formed on a side of the outer shell of sufficient size to allow for access to a mechanical splice 140 disposed therein (see further discussion below). Also, in one aspect, one or more access slots (not shown) can be provided opposite opening 113a to allow access to the mechanical splice from the opposite side. Accordingly, the design of connector 100 allows an installer to re-terminate a field optical fiber if needed or perform additional terminations using the same connector.

Figure 4:
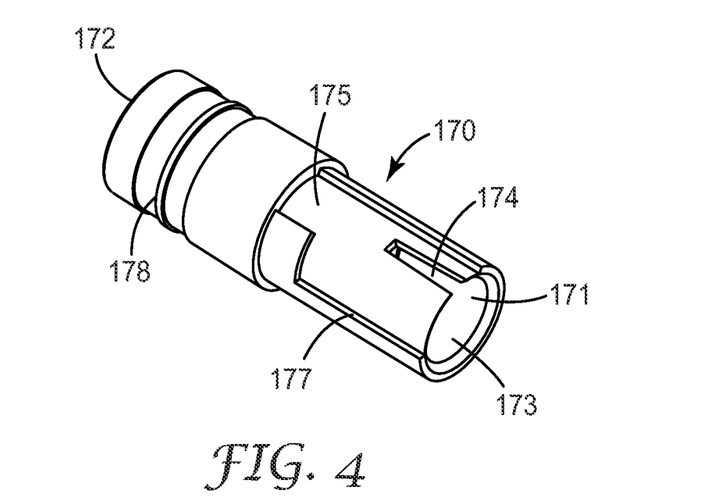
FIG. 4 is an isometric view of the retainer element of the optical connector of FIG. 1.
Figure 5:
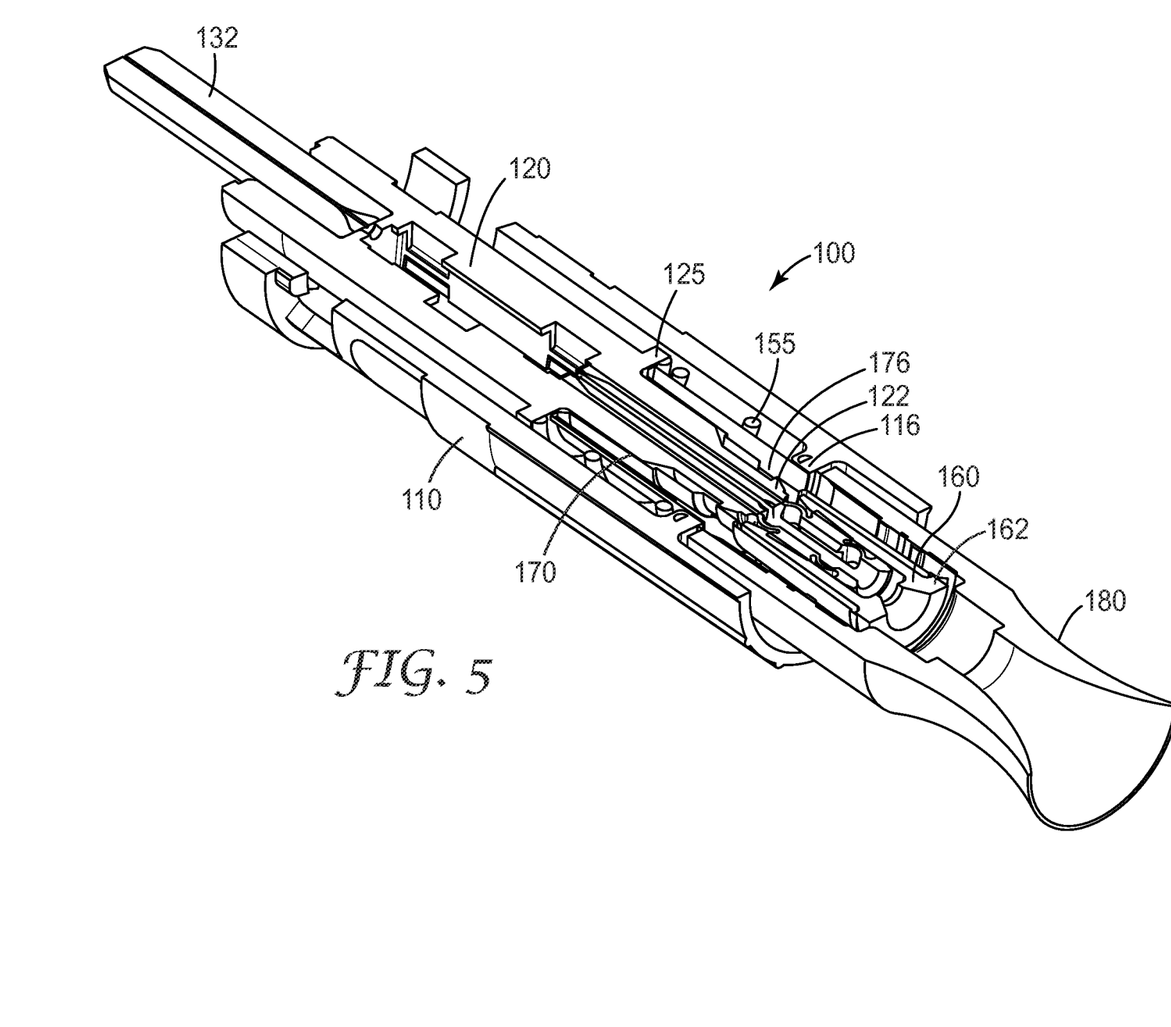
FIG. 5 is an isometric cross section view of the optical connector of FIG. 1.

As shown in FIG. 4, retainer 170 is a generally tubular structure that includes a first (e.g., front) end 171 and a second (e.g., rear) end 172. An opening 173 is provided in first end 171 and is sized to slide over a rear portion of collar body 120. The retainer 170 can be snugly or snap fit onto the collar body 120. In one aspect (see FIG. 5), the retainer can include an interference surface 176 formed within retainer 170. As shown in FIG. 5, the interference surface 176 engages a locking flange 122 formed on a rear portion of collar body 122, thereby securing the collar body 120 and retainer in place, while trapping the spring 155 against shoulder 125 of the collar body and inner ring or shoulder 116 formed inside housing 110. As mentioned in further detail herein, the retainer 170 can further include a slot 175 (see FIG. 4) formed on an outer surface of the retainer 170 to hold the rotational position of the housing prior to connection.

Retainer 170 can further include a robust mounting structure 178 disposed on a rear portion thereof. A fiber boot 180, which can be utilized to protect the optical fiber from bend related stress losses, can be mounted onto structure 178 via press, interference or screw-on fit.

According to an embodiment of the present invention, housing 110 and retainer 170 can be formed or molded from a polymer material, although metal and other suitably rigid materials can also be utilized. In one aspect, the housing 110 can be formed from a harder material than the retainer 170.

As mentioned above, connector 100 further includes a collar body 120 that is disposed within the connector housing and retained therein. The retainer 170 and collar body 120 can be keyed to one another (e.g., via collar body key 124 (FIG. 6) received by retainer slot 174 (FIG. 4)), and snapped together during assembly.

According to exemplary embodiments, the collar body 120 (a collar body element may also be referred to as a "barrel") is a multi-purpose element that can house a fiber stub assembly, a mechanical splice 140, and a fiber buffer clamp 126. As mentioned above, the collar body 120 can include a shoulder 125 (see FIG. 5) that can be used as a flange to provide resistance against spring 155, interposed between the collar body and a rear shoulder of the housing 110, when the connector is inserted in a receptacle. According to an exemplary embodiment of the present invention, collar body 120 can be formed or molded from a polymer material, although metal and other suitable materials can also be utilized. For example, collar body 120 can comprise an injection-molded, integral material.

In particular, collar body 120 includes a first end portion 121 (See FIG. 6) having an opening to receive and house a fiber stub assembly, which includes a ferrule 132 having an optical fiber 134 secured therein. As is shown in FIG. 5, collar body 120 also includes a fiber guide channel that guides a field fiber (e.g., fiber 184 from FIG. 7A) towards the ferrule. Collar body 120 can further include a key 127 formed on a front portion thereof to ensure proper alignment within a mating coupling (see an example mating shown in FIGS. 7A-7C).

Figure 6:
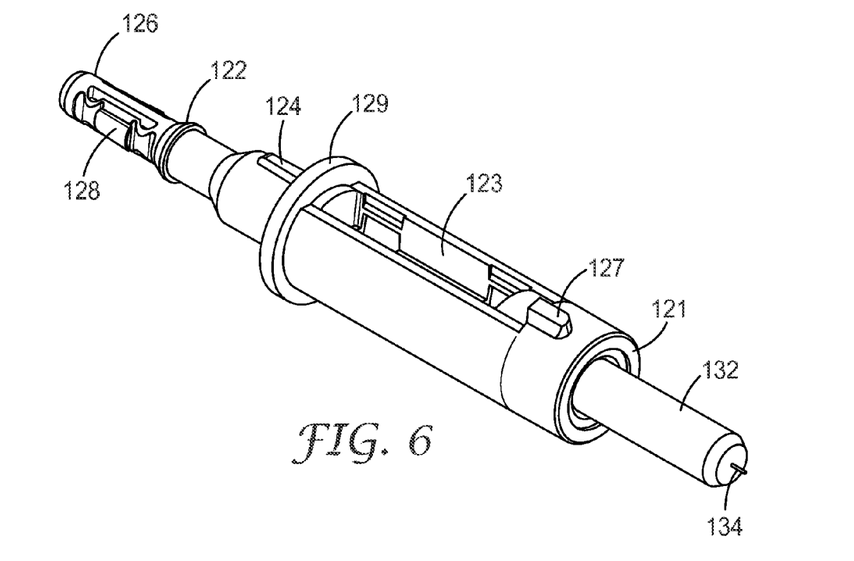
FIG. 6 is an isometric view of the collar body and ferrule of the optical connector of FIG. 1.
Figure 7A:
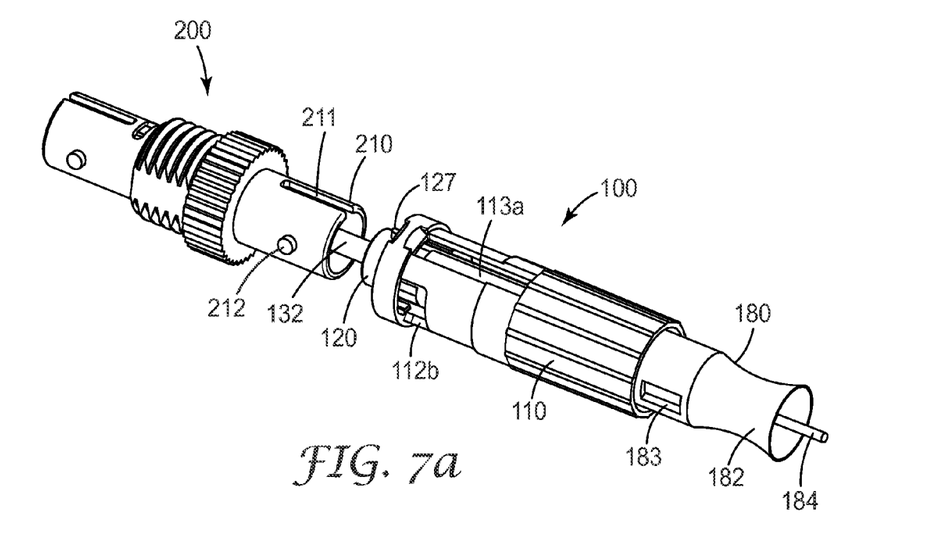
FIGS. 7A-7C show views of the optical connector of FIG. 1 connecting with an ST coupling.
Figure 7B:
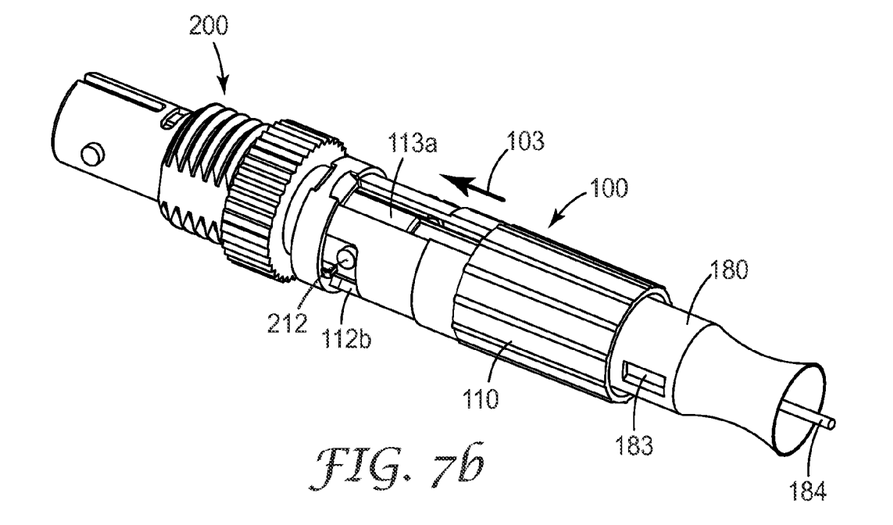
Figure 7C:
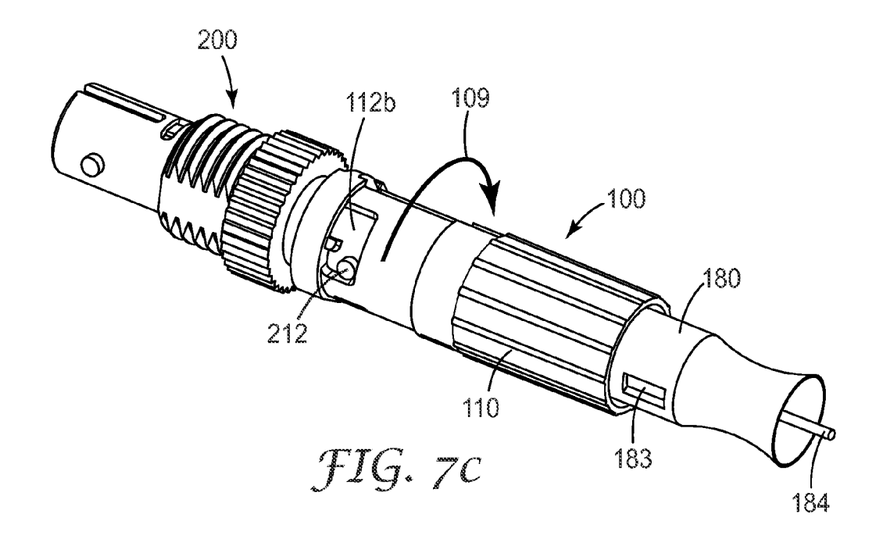

In addition, the collar body 120 further includes a key structure 124, as shown in FIG. 6, that helps align the position of the retainer 170 during assembly. The key structure 124 can be a raised structure configured to engage with a corresponding slot 174, formed on a front surface of retainer 170 (see e.g., FIG. 4).

Ferrule 132 can be formed from a ceramic, glass, plastic, or metal material to support the optical fiber 134 inserted and secured therein. In a preferred aspect, ferrule 132 is a ceramic ferrule. An optical fiber 134 is inserted through the ferrule 132, such that a first fiber stub end slightly protrudes from or is coincident or coplanar with the end face of ferrule 132. Preferably, this first fiber stub end is polished in the factory (e.g., flat, with or without bevels). A second end of the fiber 134 extends part-way into the interior of the connector 100 and is utilized to splice a second optical fiber, such as field fiber 184. Preferably, the second end of fiber 134 can be cleaved (flat, with or without bevels). In one aspect, the second end of fiber 134 can be polished in the factory to reduce the sharpness of the edge of the fiber, which can create scrapings (debris) as it is installed in the splice element. For example, an electrical arc, such as one provided by a conventional fusion splicer machine, can be utilized to melt the tip of the fiber and form a rounded end, thereby removing the sharp edges. This electrical arc technique can be used in conjunction with polishing by an abrasive material to better control end face shape while reducing possible distortion of the core. An alternative non-contact method utilizes laser energy to ablate/melt the tip of the fiber.

The stub and field fibers can comprise standard single mode or multimode optical fiber, such as SMF 28 (available from Corning Inc.). In one aspect, the field fiber can comprise a 250 or 900 μm buffer coated fiber.

In an alternative embodiment, fiber 134 additionally includes a carbon coating disposed on the outer clad of the fiber to further protect the glass-based fiber. In an exemplary aspect, fiber 134 is pre-installed and secured (e.g., by epoxy or other adhesive) in the ferrule 132, which is disposed in the first end portion 121 of collar body 120. Ferrule 132 is preferably secured within collar body portion 121 via an epoxy or other suitable adhesive. Preferably, pre-installation of the fiber stub can be performed in the factory.

As shown in FIG. 2, an end cap 105 can also be provided to protect the stub fiber end prior to installation and use.

As shown in FIG. 6, collar body 120 further includes a splice element housing portion 123. In this exemplary aspect, splice element housing portion 123 provides an opening in which a mechanical splice 140 can be inserted and secured in the central cavity of collar body 120. In an exemplary embodiment, mechanical splice 140 comprises a mechanical splice device (also referred to herein as a splice device or splice) that is similar in structure to a 3M™ FIBRLOK™ mechanical fiber optic splice device, available from 3M Company, of Saint Paul, Minn.

For example, splice element 142 is formed from a sheet of ductile material having a focus hinge that couples two legs about a fiber axis, where each of the legs includes a fiber gripping channel (e.g., a V-type (or similar) groove) to optimize clamping forces for conventional glass optical fibers received therein. The ductile material, for example, can be aluminum or anodized aluminum. In one aspect, a conventional index matching fluid can be preloaded into the V-groove region of the splice element for improved optical connectivity within the splice element. In another aspect, no index matching fluid is utilized. For example, the element 142 can have a length of about 0.3 inches to about 0.5 inches (preferably about 0.4 in.), a height of about 0.08 to about 0.12 inches (preferably about 0.105 in.), and a width (when compressed) of about 0.045 to about 0.055 inches (preferably about 0.05 in.).

Splice element 142 is mountable in a mounting device or cradle located in portion 123 of collar body 120. In an exemplary embodiment, the cradle is integrally formed in collar body 120, e.g., by molding. The internal cradle can secure (through e.g., snug or snap-fit) the axial and lateral position of the splice device 140. In one alternative aspect, one or more retainer elements, such as overhang tabs, can be used to secure the element 142 in axial and/or height position prior to actuation of the cap. In this manner, the splice device 140 cannot be rocked or easily moved forward or backward once installed.

In an exemplary embodiment, in operation, as the cap 144 is moved from an open position to a closed position, one or more cam bars located on an interior portion of the cap 144 can slide over splice element legs, urging them toward one another. Two fiber ends, (e.g., one end of fiber 134 and one end of the field fiber 184) are held in place in grooves formed in the splice element and butted against each other and are spliced together in a channel to provide sufficient optical connection, as the element legs are moved toward one another.

Similar splice elements are described in U.S. Pat. No. 5,159,653, incorporated herein by reference in its entirety. Other conventional mechanical splice devices can also be utilized in accordance with alternative aspects of the present invention and are described in U.S. Pat. Nos. 4,824,197; 5,102,212; 5,138,681; and 5,155,787, each of which is incorporated by reference herein, in their entirety. In alternative aspects, connector 100 can be configured to operate with other types of conventional mechanical splice devices.

Mechanical splice 140 allows a field technician to splice the second end of fiber stub 134 to a field optical fiber 184 at a field installation location. The term "splice," as utilized herein, should not be construed in a limiting sense since splice 140 can allow removal of a fiber. For example, the element can be "re-opened" after initial actuation, as slots may be formed in the collar body 120 and housing 110 to permit entry of a tool that moves cap 144 from an actuated position within the cradle to a non-actuated position. This configuration permits repositioning of the spliced fibers, followed by replacement of the cap to the actuating position.

In one aspect, the rotational position of the housing 110 is held in place prior to field termination so that the cap 144 is easily accessible via housing slot 113a. When a field fiber is terminated, the cap 144 is depressed beneath the inner surface of housing 110, thus permitting limited rotation of the housing 110 during a connection/coupling.

Further, collar body 120 includes a buffer clamping portion 126 that can be configured to clamp the buffer portion of the field fiber 184 being spliced. In an exemplary aspect, the buffer clamping portion 126 is disposed within the interior of the retainer 170 in the fully assembled connector. In a preferred aspect, buffer clamping portion 126 is an integral part of the connector structure. For example, FIG. 6 shows buffer clamping portion 126 including one or more longitudinally formed slots, resulting in a collet-like shape. This configuration creates clamping fingers 128 to depress and engage the buffer portion of a field fiber 184 when a sleeve 160 is slidingly fitted over buffer clamp 126 by moving sleeve 160 in an axial direction towards the connector housing. In this aspect, sleeve 160 is a tube-like structure configured to snugly fit over clamping portion 126. In one aspect, sleeve 160 can further include a flange portion 162 formed on an outer surface of at least one end of the sleeve 160. This flange 162 can allow a field technician to more easily grip sleeve 160 in the event that the sleeve needs to be disengaged (e.g., pulled off) from the clamping portion (e.g., when using pliers or a similar tool). Other alternative buffer clamps structures can also be utilized, such as described in US Patent Publication No. 2007/0104425 A1, incorporated by reference herein.

In a further alternative aspect, connector 100 can include a collar body having a flexible mounting portion for the ferrule, such as is described in U.S. Patent Publication No. 2012/0027360, incorporated by reference herein in its entirety.

To prevent sharp fiber bends at the connector/fiber interface, a boot 180 can be utilized. The boot 180 is coupled to the back end of connector 100 and includes a front face portion 181 configured to engage the rear portion 178 of the retainer 170. In an exemplary aspect, boot 180 includes a flare-shaped tail 182 to provide sufficient performance when using a variety of fiber types for field fiber 184 (e.g., 250 μm or 900 μm fibers). This type of boot can be pre-installed in the factory (i.e., fitted onto the connector prior to the field fiber termination). Optionally, boot 180 can further include slots 183 that provide the user access to the flange 162 of sleeve 160, for example, if there is a need for deactivation of the connector.

Alternatively, another boot shape can be utilized. Other boot configurations are described in US Patent Publication No. 2007/0104425 A1, incorporated by reference herein.

FIGS. 7A-7C show an example connection between ST connector 100 and an exemplary ST coupling 200, the twist bayonet-shaped outer housing 110 can be rotated to one of two workable positions, pushed forward, further rotated ⅛ of a turn, and released. In more detail, connector 100 can be inserted axially into ST coupling 200 (ferrule end first), with key feature 127 aligned to a keyway 211 formed in a first end portion 210 of ST coupling 200. FIG. 7A shows connector 100 prior to connection, where access slot 113a is positioned over mechanical splice 140. FIG. 7B shows connector 100 during the connection process. FIG. 7C shows connector 100 connected to coupling 200.

In this exemplary aspect, the outer housing 110 is keyed to the rest of the connector. By keying the bayonet cap to the rest of the connector, the opening provided in it for accessing the element actuation cap is kept in the correct position from the time of factory assembly. This keeps from having to manually reposition the bayonet cap during the installation process. In contrast, for conventional ST connectors, the twist bayonet cap is free to rotate about the major axis of the connector without restraint.

Figure 8A:
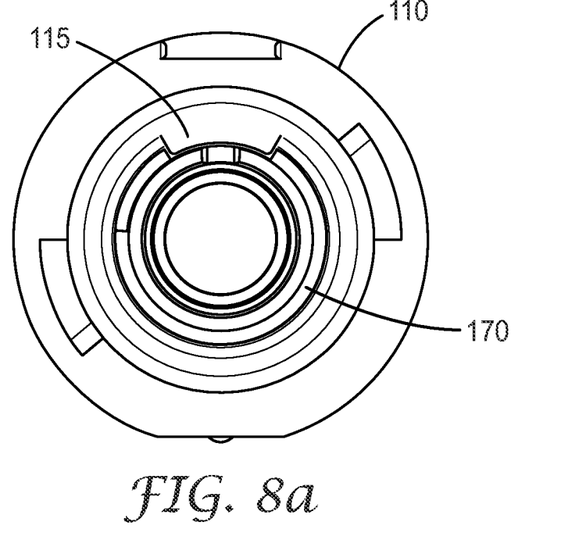
FIGS. 8A and 8B show end views of the optical connector of FIG. 1 at different stages of connection with an ST coupling.

While the connector 100 is in an unconnected state, as shown in end view (from the ferrule end) in FIG. 8A, an inner tab 115 of the outer housing 110 is disposed in a retention slot 175 formed on an outer surface of the retainer 170 (see FIG. 4). During a connection, as is shown in FIG. 7B, the outer housing 110 is pushed (e.g., via simple hand force) forward toward the coupling 200 in the direction of arrow 103. This motion releases tab 115 from the retention slot 175, thus permitting some rotation. In addition, the collar body key 127 slides into slot 211 to maintain alignment between the connector 100 and the housing 200 and to help prevent rotation of the connector sub-components as the outer housing 110 is twisted. Also, coupling post 212 (and one formed on the opposite side of coupling portion 210) slides past notch 114a, 114b (see FIG. 3) formed on an inner surface of the opening 111 of the outer housing.

Figure 8B:
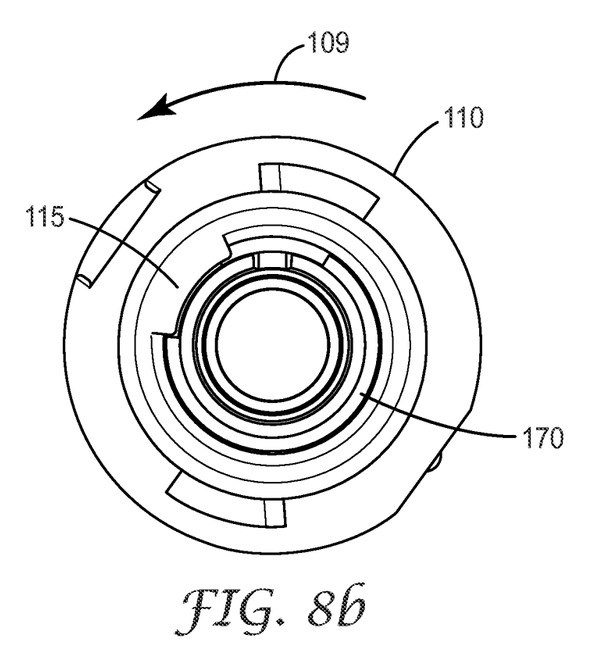

In this aspect, rotation is limited to about ⅛ to about ¼ turn in one direction, as the retainer further includes a ledge 177 (see FIG. 4) that can stop tab 115 from further rotation when the tab 115 is released from retention slot 175. For example, in FIG. 7C, the outer housing 110 is rotated (e.g., about ⅛ turn) in the direction of arrow 109. An end view showing the position of the rotated tab 115 relative to the retainer 170 is provided in FIG. 8B. In the connected position, posts 212 are captured in slots 112a, 112b.

Since the retainer 170 is keyed to the collar body, rotation of the outer housing about the axis of the connector is limited. This arrangement not only places the element cap access opening 113a in a preferential position, it also pre-aligns the retention feature lead-ins readying it for engagement with a coupling.

In addition, as mentioned above, connector 100 can allow for the deactivation of the buffer clamp 126. In one aspect, boot 180 can optionally include access slots 183 (e.g., formed on opposite sides of boot 180). For example, a user can employ a simple field tool that extends into slots 183 and engages the flange portion 162 of the sleeve 160. The sleeve can be pulled back to deactivate the buffer clamp. As the mechanical splice 140 can also be deactivated, the field fiber can be removed from the connector without damage.

Field termination can be accomplished using a field termination platform or tool, such as is described in U.S. Pat. No. 7,369,738, incorporated by reference herein, in its entirety. Such a tool can provide for repeatable, accurate fiber insertion in the optical connector. This tool or platform can be provided to allow field termination of an optical fiber in an ST connector without the need to perform field polishing or use epoxies.

The ST connector described above can be used in many conventional optical connector applications. The optical connectors described above can also be utilized for termination (connectorization) of optical fibers for interconnection and cross connection in optical fiber networks inside a fiber distribution unit at an equipment room or a wall mount patch panel, inside pedestals, cross connect cabinets or closures or inside outlets in premises for optical fiber structured cabling applications. The optical connectors described above can also be used in termination of optical fiber in optical equipment. In addition, one or more of the optical connectors described above can be utilized in alternative applications.

As mentioned above, the ST connector of the exemplary embodiments is of compact length and is capable of straightforward field termination with reduced assembly times. Such exemplary connectors can be readily installed and utilized for FTTP and/or FTTX network installations, such as part of a fiber distribution unit.

Various modifications, equivalent processes, as well as numerous structures to which the present invention may be applicable will be readily apparent to those of skill in the art to which the present invention is directed upon review of the present specification.

We claim:

1. An ST format optical connector for terminating an optical fiber, comprising:
    a housing configured to mate with an ST receptacle or coupling, the housing having an ST bayonet-style format;
    a collar body disposed in the housing;
    a retainer disposed in the housing, wherein the retainer is disposed between the collar body and the housing, and wherein the housing is prevented from fully rotating about the collar body and retainer; and
    a fiber boot to restrict a lateral motion of the optical fiber, the fiber boot mountable to a portion of the retainer,
    wherein the collar body further includes a buffer clamp configured within a third portion of the collar body, the buffer clamp configured to clamp at least a portion of a buffer cladding of the optical fiber upon actuation; and a buffer clamp actuation sleeve configured to be received on an outer surface of the third portion of the collar body and configured to slidably actuate the buffer clamp, the buffer clamp actuation sleeve including a flange portion formed on one end thereof, and
    wherein the fiber boot further includes one or more access slots formed through the outer surface thereof configured to permit access to the flange portion of the buffer clamp actuation sleeve when the buffer clamp actuation sleeve is mounted on the buffer clamp.

2. The ST format optical connector of claim 1, wherein the collar body includes a fiber stub disposed in a first portion of the collar body, the fiber stub being mounted in a ferrule and having a first end proximate to an end face of the ferrule and a second end, wherein the collar body further includes a mechanical splice disposed in a second portion of the collar body, the mechanical splice configured to splice the second end of the fiber stub to the optical fiber.

3. The ST format optical connector of claim 2, wherein the housing includes a housing slot positionable over the mechanical splice.

4. The ST format optical connector of claim 1, wherein the housing includes an inner tab receivable within a retention slot formed on an outer surface of the retainer when the connector is in an unconnected state.

5. The ST format optical connector of claim 4, wherein, during a connection with an ST coupling, when the housing is moved toward the ST coupling, the inner tab is released from the retention slot.

6. The ST format optical connector of claim 5, therein the collar body further includes a key structure formed on an outer surface configured to be received by a slot formed in the ST coupling.

7. The ST format optical connector of claim 5, wherein the retainer further includes a ledge formed on an outer surface thereof configured to contact the inner tab to prevent additional rotation of the housing.

\* \* \* \* \*